Patented Jan. 2, 1923.

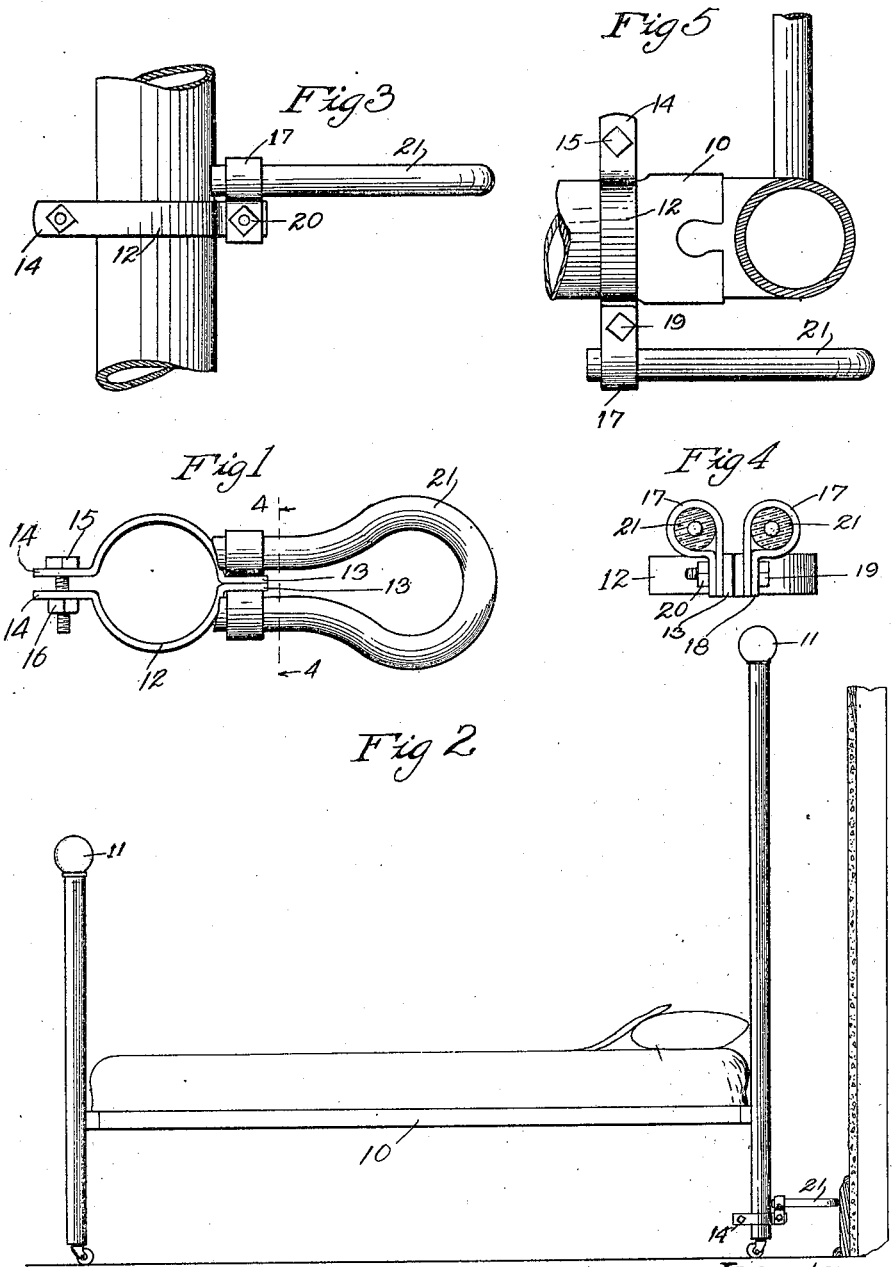

1,440,783

UNITED STATES PATENT OFFICE.

THOMAS KILEY, OF DES MOINES, IOWA.

WALL-PROTECTING STOP.

Application filed April 13, 1922. Serial No. 552,084.

*To all whom it may concern:*

Be it known that I, THOMAS KILEY, a citizen of the United States, and a resident of Des Moines, in the county of Polk and State of Iowa, have invented a certain new and useful Wall-Protecting Stop, of which the following is a specification.

The object of my invention is to provide a wall protecting stop of very simple, durable and inexpensive construction.

A further object is to provide such a device, which may be readily and easily mounted on a bed leg or cross-bar, and which is capable of adjustment for mounting either on a horizontal or vertical member, and which has a projecting cushioning device of simple construction, capable of adjustment for protecting the wall against being struck by the article on which the stop is installed.

With these and other objects in view, my invention consists in the construction, arrangement and combination of the various parts of my device, whereby the objects contemplated are attained, as pointed out in my claim, and illustrated in the accompanying drawings, in which:

Figure 1 shows a top or plan view of the wall protecting stop embodying my invention.

Figure 2 shows a side elevation of the same equipped with my improved stop.

Figure 3 shows an enlarged, detailed, side elevation of the bed leg having my stop installed thereon.

Figure 4 shows a detailed, sectional view taken on the line 4—4 of Figure 1; and Figure 5 shows a detailed view illustrating my stop installed on a horizontal member.

In explaining the need for a device of the kind herein considered, it is well-known that in hospitals and other places, where a large number of beds are used, the beds are frequently moved and are frequently shoved against the wall, thus marring the wall and destroying the paint or decorations or finish thereof.

In the accompanying drawings, I have used the reference numeral 10 to indicate generally a bed. The bed has at the top at its upper portion a knob or the like 11, which is likely to be struck against the wall, thus injuring the plastering, paper or other finish. Such injuries necessitate frequent repairing, redecorating or sometimes re-plastering.

My improved wall protecting stop, comprises a pair of substantially semi-annular clamp members 12, having at their opposite ends parallel projecting flanges 13 and 14. A screw bolt 15 is extended through suitable holes in the flanges 14, and has an adjustable nut 16 thereon.

I provide broken clamping rings 17, each having a pair of parallel projecting flanges 18. One of the flanges 18 is preferably arranged substantially tangentially of the circle of the clamping ring, as shown particularly in Figure 4, in order that the two flanges 18 may be placed adjacent to the flanges 13, as shown in Figures 1 and 4, and secured thereto by means of a screw bolt 19 and a nut 20.

When the members 12 are arranged horizontally, the flanges 18 may be arranged vertically, as shown in Figures 1, 2, 3 and 4. The clamping rings 18 are designed to receive the ends of a heavy resilient hose or the like 21, which will thus project away from the members 12, as illustrated particularly in Figure 1.

By removing the screw bolt 19 and arranging the flanges 18 parallel with the flanges 13, the member 21 may be arranged to project at right angles from the members 12, as shown in Figure 5.

It will thus be seen that my device can be readily adjusted to be fitted in different places and on different pieces of furniture.

The arrangement of the members 12 and the bolt 15 permits considerable adjustment of the clamp, consisting of the members 12, for adjustment to bed legs and the like of different sizes.

It will, of course, be understood that the members 12 may be of different shapes to fit various pieces of furniture.

It will also be noted that the ends of the member 21 may be adjusted longitudinally thereof in the clamping rings 17.

Ordinarily, I preferably arrange said ends so that they will abut against the leg of the bed 10 or the like, as shown in Figure 3. The other length of the member 21 may be readily varied by cutting off portions of the ends thereof.

Some changes may be made in the construction and arrangement of the details of my improved wall protecting stop, without departing from the real spirit and purpose of my invention, and it is my intention to cover by my claim, any modified forms of structure or use of mechanical equivalents, which may be reasonably included within its scope.

I claim as my invention:

In a device of the class described adapted for use on the legs of an article of furniture, comprising a pair of similar receiving members having projecting flanges at their opposite ends, adjustable means for connecting said flanges together, a pair of clamping rings, each having parallel projecting flanges, one flange of each ring being arranged tangentially to the ring, said last flanges being adapted to be connected with a pair of flanges on said first members by the means whereby said last named flanges of the first members are connected, a resilient element having generally the form of a U with its ends received in said clamping rings, the parts being so arranged that the U shaped element may be swung to position where it is substantially at right angles to the receiving members or may be positioned where it is substantially parallel thereto.

THOMAS KILEY.